Nov. 20, 1962 — H. P. EICHIN ET AL — 3,064,803
FOOD CASING PACKAGE
Filed Dec. 29, 1960 — 2 Sheets-Sheet 1

INVENTORS
EDWARD A. MATECKI
HARRY P. EICHIN
BY
ATTORNEY

Nov. 20, 1962     H. P. EICHIN ET AL     3,064,803
FOOD CASING PACKAGE

Filed Dec. 29, 1960     2 Sheets-Sheet 2

INVENTORS
EDWARD A. MATECKI
HARRY P. EICHIN

ATTORNEY

United States Patent Office 3,064,803
Patented Nov. 20, 1962

3,064,803
FOOD CASING PACKAGE
Harry P. Eichin, Western Springs, and Edward A. Matecki, Evergreen Park, Ill., assignors to Union Carbide Corporation, a corporation of New York
Filed Dec. 29, 1960, Ser. No. 79,204
4 Claims. (Cl. 206—65)

This invention relates to food casings and a method of packaging the same. More particularly, this invention relates to packaging cellulosic sausage casings in the form of flattened tubing.

Sausage products such as bologna are commonly stuffed in synthetic or artificial and preferably in cellulosic sausage casings. These are shipped to the sausage maker by the casing manufacturer as flattened tubing of desired length and diameter. Before stuffing the casing with meat emulsion, the sausage makers make a first closure at one end of the casing. The closure in the dry casing is usually made by first gathering a short length of flattened casing adjacent one end and then tying the gathering with cord or twine or applying one of several types of commercial eyelets or metal closure clips. Also, a length of cord or twine can be attached to this end for hanging the stuffed casing.

The gathering and closure of one end of cellulosic sausage casings can be done on one of several semi-automatic tying or gathering closure machines commercially sold for the purpose, or may be done manually.

When done in an automatic machine, it is necessary that the machine be properly adjusted for the width of casing being tied and that the casing be accurately centered therein. Before mechanical gathering, it is preferred that the casing be moisture-conditioned to enhance its pliability.

When automatic twine-tying equipment is used, it must be adjusted so that the twine is not pulled too tightly into the casing, thereby weakening or cutting the casing wall. If these conditions are not observed, the gathering closure operation can seriously damage the casing and thus adversely affect the strength of the tie closure.

Furthermore, there is a trend toward stuffing longer lengths of casing to improve automatic slicing efficiency in a subsequent slice-packaging operation. Unit sausage weights of 20 to 25 pounds and lengths of 4 feet are now not uncommon. Such heavy unit weights place a considerable strain on the casing, tie and hanger loop throughout the sausage processing steps, thereby necessitating careful and uniform closing of the casing end.

Careless or non-uniform tying of the first closure in the casings in preparation for stuffing as herein described, often is the actual cause of casing breakage at the stuffing table or in the smokehouse. Such breakage is generally blamed on the casing itself. To avoid this, the casing manufacturer has found it desirable to pre-tie casings under controlled conditions before shipment, in order to ensure maximum utilization of the casing strength characteristics. Meat packers thereby eliminate the expense and annoyance of casing breakage and do not need equipment now used to make the tie.

Present gathering operations preliminary to making the first enclosure at one end of the casings yields a fairly bulky product which does not readily nest and therefore cannot be compactly packaged. Packages of such partially gathered sausage casings are more apt to be damaged in transit than flat, untied casings.

It is an object of this invention to provide a method for pre-tying and packaging sausage casings.

Another object of this invention is to provide a method for compact packaging of a plurality of pre-tied sausage casings.

Still another object of this invention is to package pre-tied sausage casings in a manner which results in minimum shipping damage to the casing.

Other and additional objects will become apparent hereinafter.

In accordance with the present invention, a pleated pre-tied sausage casing is made from a flattened synthetic and preferably cellulosic tubing of desired length and diameter, by pleating the full length of the casing, and forming a closure at one end, preferably having an attached casing hanger. A plurality of such full length pleated and pre-tied casings are then assembled into a package or bundle by superimposing one casing upon another with the outermost pleated surfaces of adjacent casings in abutting relationship and with the open ends and the closed or pre-tied ends in staggered relationship. The casings can be thus bundled into convenient units, such as 10 to 25 pieces, by tightly banding them with a plurality of water-soluble band means, such as pressure-sensitive tape bands wherein the band material can have a water-soluble adhesive or may itself be made of a water-soluble film.

When the banded casings are to be used for stuffing, the entire bundle is immersed and soaked in water to impart pliability to the casings for the stuffing operation, and the band adhesive or entire bands dissolve to release the casings from their assembled relationship. The loose, soft and pliable casings are then individually available for the stuffing operation.

The nature of the invention and the manner in which this invention may be practiced will become clear from the detailed description when taken in conjunction with the accompanying drawings forming a part of this specification and wherein.

Figure 1:
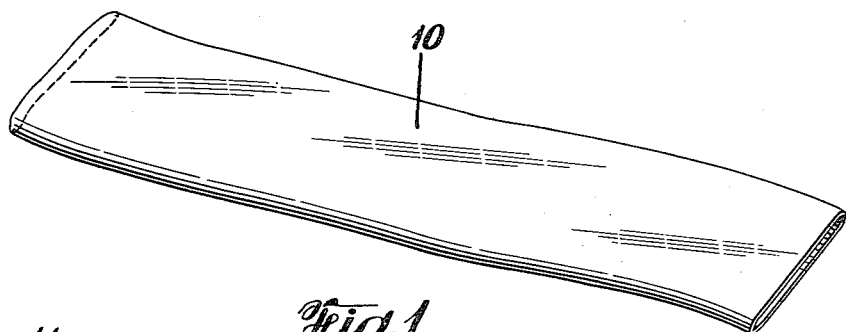
FIGURE 1 is a perspective of a piece of flattened cellulosic sausage casing.

Referring to the drawings and first to FIGURE 1, a cellulosic sausage casing 10 in the form of flattened tubing having a length of 48 inches and a diameter of 4⅜ inches is shown before pleating and tying off one end.

Figure 2:
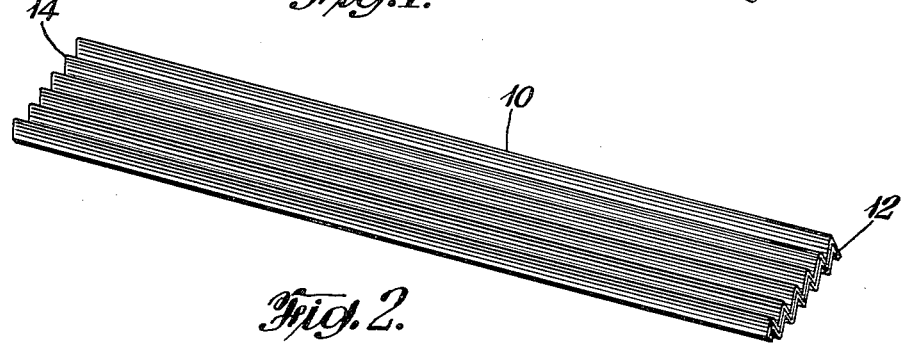
FIGURE 2 is a perspective of a piece of sausage casing pleated full length.

As shown in FIGURE 2, the casing 10 has been folded on to itself to form uniform zig-zag full length pleats wherein the creases alternately point outward and inward as in the bellows of an accordion. It is to be noted full length pleating of the casing 10 is necessary as an operation preliminary to forming a compact package or bundle of a plurality of pleated pre-tied sausage casings.

Figure 3:
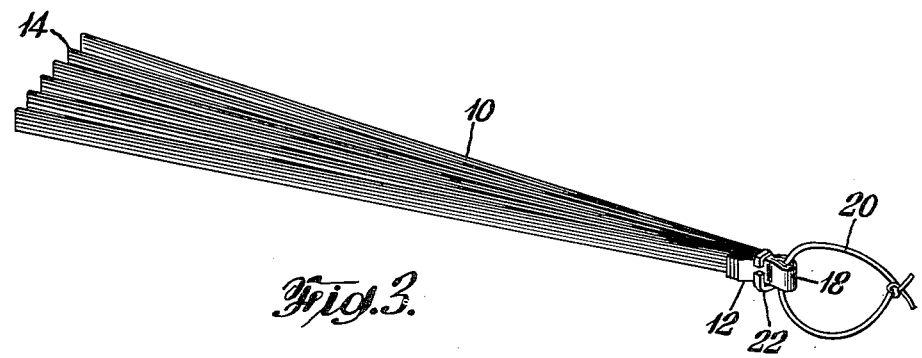
FIGURE 3 is a perspective of a pleated sausage casing with a clip and twine hanger.
Figure 5:
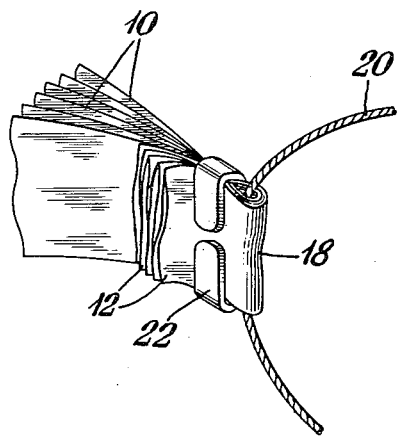
FIGURE 5 is an enlarged perspective of portion of pre-tied sausage casing showing the closure.

Thereafter and as shown in FIGURES 3 and 5, the casing pleats at one end 12 are gathered up and bent around a pre-tied twine hanger loop 20. The bend 18 in the gathered pleated casing is then fastened with a V-shaped metal clip 22 by placing the clip about the bend 18 and folding the clip legs thereupon.

It is to be noted that the casing end 12 can be closed and the loop 20 can be attached in other ways. For example, an eyelet, not shown, can be applied to close the gathered casing end 12 and then twine or cord can be threaded through the eyelet and tied to form the loop 12. The foregoing can also be accomplished by inserting the knotted end of the loop 20 between the pleats at the casing end 12 and then attach a metal clip to the gathered casing end 12 below said knot. In any event, the opposite end 14 of the casing 10 remains open for the subsequent stuffing operation.

Figure 4:
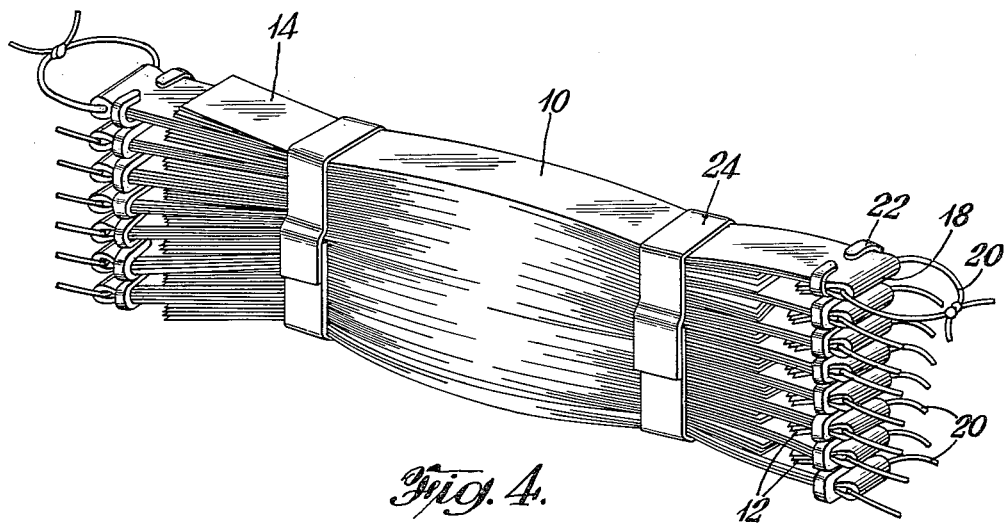
FIGURE 4 is a perspective of a banded bundle of pre-tied sausage casing.

In FIGURE 4, the prepared pre-tied casings 10 have been assembled into a package or bundle of 15 pieces by staggering the open end 14 and closed end 12 of successive pieces of casings. The casings are superimposed one upon the other with the outermost pleats of the adjacent pieces in abutting relationship and are banded under pressure by bands 24. The bands 24 are made of appropriate paper or plastic material and joined with a pressure-sensitive tape, which has a water-soluble adhesive. In another embodiment, the tapes 24 can be made of water-soluble film, such as film made from "polyethylene oxide" resin. The resin is sold under the trademark "Polyox" and the film is sold under the trademark "Hylox," both being made by Union Carbide Corporation.

Thus, the fully pleated and pre-tied sausage casings readily nest and can be compactly packaged safe for transit. Furthermore, by pre-tying the casings under controlled conditions before shipment, maximum utilization of the casing strength is ensured. Also, by the practice of the present invention, meat packers save the expense and annoyance of casing breakage, do not need equipment now used to make the tie, and save labor used thereon because the casings can be purchased in a pre-tied condition, compactly packaged in a break-free manner ready for soaking and stuffing.

When the casings are to be used for stuffing, the entire package can be immersed in water without releasing the casings from the confining bands. The band adhesive or entire bands dissolve as the casings soak to thereby release them from the package as the casings become soft and pliable, ready for the stuffing operation.

It will be obvious to those skilled in the art that various changes and modifications may be made in the described method and package without departing from the nature and spirit of the invention.

What is claimed is:

1. A package comprising a plurality of pre-tied synthetic sausage casings wherein each of the casings is in the form of flattened tubing fully pleated its entire length with the pleats gathered in compressed relationship and wherein each of said pleated and gathered casings has an open and closed end and a stuffed sausage casing hanger attached to said closed end, said pre-tied casings are compactly assembled with the outermost pleated surfaces of adjacent casings in abutting relationship and with the open and closed ends in staggered relationship, and water-soluble means for maintaining the assembled casings in position.

2. The package as claimed in claim 1 wherein the water-soluble means are pressure sensitive bands having an adhesive which is water soluble.

3. The package as claimed in claim 1 wherein the water-soluble means are pressure sensitive bands made from water-soluble film.

4. The package as claimed in claim 1 wherein full length pleated cellulosic sausage casings are bonded together with a water-soluble means, said casings being individually available in a loose, soft and pliable condition for stuffing upon immersion and soaking of the package in water to dissolve the water-soluble bonding means.

References Cited in the file of this patent

UNITED STATES PATENTS

| | | |
|---|---|---|
| 513,813 | Munro | Jan. 30, 1894 |
| 2,042,227 | Hensel | May 26, 1936 |
| 2,307,181 | Young | Jan. 5, 1943 |
| 2,462,957 | Gunn | Mar. 1, 1949 |
| 2,750,027 | Cummings | June 12, 1956 |
| 2,781,902 | Smithers | Feb. 19, 1957 |